(12) United States Patent
Chen et al.

(10) Patent No.: US 8,788,256 B2
(45) Date of Patent: Jul. 22, 2014

(54) MULTIPLE LANGUAGE VOICE RECOGNITION

(75) Inventors: Ruxin Chen, Redwood City, CA (US); Gustavo Hernandez-Abrego, Mountain View, CA (US); Masanori Omote, Palo Alto, CA (US); Xavier Menendez-Pidal, Campbell, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 531 days.

(21) Appl. No.: 12/698,963

(22) Filed: Feb. 2, 2010

(65) Prior Publication Data

US 2010/0211376 A1 Aug. 19, 2010

Related U.S. Application Data

(60) Provisional application No. 61/153,267, filed on Feb. 17, 2009.

(51) Int. Cl.
G06F 17/20 (2006.01)

(52) U.S. Cl.
USPC ............... 704/2; 704/9; 704/270; 704/260; 704/259; 704/257; 704/256; 704/255; 704/243; 704/235; 704/231; 704/209; 701/36; 434/156

(58) Field of Classification Search
USPC ......... 704/260, 2, 9, 270, 259, 257, 256, 255, 704/243, 235, 231, 209; 701/36; 434/156
See application file for complete search history.

(56) References Cited

U.S. PATENT DOCUMENTS

| 4,956,865 | A | 9/1990 | Lennig et al. ............... 704/241 |
| 4,977,598 | A | 12/1990 | Doddington et al. ......... 704/255 |
| RE33,597 | E | 5/1991 | Levinson et al. ............. 704/256 |
| 5,031,217 | A | 7/1991 | Nishimura ................. 704/256.4 |
| 5,050,215 | A | 9/1991 | Nishimura ................. 704/256.4 |
| 5,129,002 | A | 7/1992 | Tsuboka ....................... 704/246 |
| 5,148,489 | A | 9/1992 | Erell et al. .................... 704/226 |
| 5,222,190 | A | 6/1993 | Pawate et al. ................. 704/200 |
| 5,228,087 | A | 7/1993 | Bickerton ..................... 704/232 |

(Continued)

FOREIGN PATENT DOCUMENTS

| EP | 0866442 | 9/1998 |
| EP | 1571651 A1 | 9/2005 |
| WO | WO 2004111999 A1 | 12/2004 |

OTHER PUBLICATIONS

Lawrence Rabiner, "A Tutorial on Hidden Markov Models and Selected Application Speech Recognition"—Proceeding of the IEEE, vol. 77, No. 2, Feb. 1989.

(Continued)

*Primary Examiner* — Michael Colucci
(74) *Attorney, Agent, or Firm* — Joshua D. Isenberg; JDI Patent

(57) ABSTRACT

Computer implemented speech processing generates one or more pronunciations of an input word in a first language by a non-native speaker of the first language who is a native speaker of a second language. The input word is converted into one or more pronunciations. Each pronunciation includes one or more phonemes selected from a set of phonemes associated with the second language. Each pronunciation is associated with the input word in an entry in a computer database. Each pronunciation in the database is associated with information identifying a pronunciation language and/or a phoneme language.

9 Claims, 4 Drawing Sheets

(56) References Cited

U.S. PATENT DOCUMENTS

| | | | |
|---|---|---|---|
| 5,345,536 A | 9/1994 | Hoshimi et al. | 704/243 |
| 5,353,377 A | 10/1994 | Kuroda et al. | 704/256.1 |
| 5,438,630 A | 8/1995 | Chen et al. | 382/159 |
| 5,455,888 A | 10/1995 | Iyengar et al. | 704/203 |
| 5,459,798 A | 10/1995 | Bailey et al. | 382/218 |
| 5,473,728 A | 12/1995 | Luginbuhl et al. | 704/243 |
| 5,502,790 A | 3/1996 | Yi | 704/256 |
| 5,506,933 A | 4/1996 | Nitta | 704/256 |
| 5,509,104 A | 4/1996 | Lee et al. | 704/256 |
| 5,535,305 A | 7/1996 | Acero et al. | 704/256 |
| 5,581,655 A | 12/1996 | Cohen et al. | 704/245 |
| 5,602,960 A | 2/1997 | Hon et al. | 704/207 |
| 5,608,840 A | 3/1997 | Tsuboka | 704/236 |
| 5,615,296 A | 3/1997 | Stanford et al. | 704/270.1 |
| 5,617,407 A | 4/1997 | Bareis | 369/275.3 |
| 5,617,486 A | 4/1997 | Chow et al. | 382/181 |
| 5,617,509 A | 4/1997 | Kushner et al. | 704/256 |
| 5,627,939 A | 5/1997 | Huang et al. | 704/256 |
| 5,649,056 A | 7/1997 | Nitta | 704/256 |
| 5,649,057 A | 7/1997 | Lee et al. | 704/256 |
| 5,655,057 A | 8/1997 | Takagi | 704/233 |
| 5,677,988 A | 10/1997 | Takami et al. | 704/256 |
| 5,680,506 A | 10/1997 | Kroon et al. | 704/203 |
| 5,680,510 A | 10/1997 | Hon et al. | 704/255 |
| 5,719,996 A | 2/1998 | Chang et al. | 704/256 |
| 5,745,600 A | 4/1998 | Chen et al. | 382/218 |
| 5,758,023 A | 5/1998 | Bordeaux | 704/256 |
| 5,787,396 A | 7/1998 | Komori et al. | 704/256 |
| 5,794,190 A | 8/1998 | Linggard et al. | 704/232 |
| 5,799,278 A | 8/1998 | Cobbett et al. | 704/256 |
| 5,812,974 A | 9/1998 | Hemphill et al. | 704/256.4 |
| 5,825,978 A | 10/1998 | Digalakis et al. | 704/256 |
| 5,835,890 A | 11/1998 | Matsui et al. | 704/255 |
| 5,860,062 A | 1/1999 | Taniguchi et al. | 704/256 |
| 5,880,788 A | 3/1999 | Bregler | 348/515 |
| 5,890,114 A | 3/1999 | Yi | 704/256 |
| 5,893,059 A | 4/1999 | Raman | 704/256.2 |
| 5,903,865 A | 5/1999 | Ishimitsu et al. | 704/256 |
| 5,907,825 A | 5/1999 | Tzirkel-Hancock | 704/243 |
| 5,913,193 A | 6/1999 | Huang et al. | 704/258 |
| 5,930,753 A | 7/1999 | Potamianos et al. | 704/256.2 |
| 5,937,384 A | 8/1999 | Huang et al. | 704/256 |
| 5,943,647 A | 8/1999 | Ranta | 704/251 |
| 5,956,683 A | 9/1999 | Jacobs et al. | 704/270.1 |
| 5,963,903 A | 10/1999 | Hon et al. | 704/256 |
| 5,963,906 A | 10/1999 | Turin | 704/256 |
| 5,983,178 A | 11/1999 | Naito et al. | 704/245 |
| 5,983,180 A | 11/1999 | Robinson | 704/254 |
| 6,009,390 A | 12/1999 | Gupta et al. | 704/240 |
| 6,009,391 A | 12/1999 | Asghar et al. | 704/243 |
| 6,023,677 A | 2/2000 | Class et al. | 704/254 |
| 6,035,271 A | 3/2000 | Chen | 704/207 |
| 6,061,652 A | 5/2000 | Tsuboka et al. | 704/245 |
| 6,067,520 A | 5/2000 | Lee | 704/270 |
| 6,078,884 A | 6/2000 | Downey | 704/243 |
| 6,092,042 A | 7/2000 | Iso | 704/240 |
| 6,108,627 A * | 8/2000 | Sabourin | 704/243 |
| 6,112,175 A | 8/2000 | Chengalvarayan | 704/256.5 |
| 6,138,095 A | 10/2000 | Gupta et al. | 704/234 |
| 6,138,097 A | 10/2000 | Lockwood et al. | 704/256.2 |
| 6,148,284 A | 11/2000 | Saul | 704/256.4 |
| 6,151,573 A | 11/2000 | Gong | 704/256.2 |
| 6,151,574 A | 11/2000 | Lee et al. | 704/256 |
| 6,188,982 B1 | 2/2001 | Chiang | 704/256.5 |
| 6,188,984 B1 * | 2/2001 | Manwaring et al. | 704/260 |
| 6,223,159 B1 | 4/2001 | Ishii | 704/256.7 |
| 6,226,612 B1 | 5/2001 | Srenger et al. | 704/256.2 |
| 6,236,963 B1 | 5/2001 | Naito et al. | 704/241 |
| 6,246,980 B1 | 6/2001 | Glorion et al. | 704/231 |
| 6,253,180 B1 | 6/2001 | Iso | 704/244 |
| 6,256,607 B1 | 7/2001 | Digalakis et al. | 704/222 |
| 6,272,464 B1 * | 8/2001 | Kiraz et al. | 704/257 |
| 6,292,776 B1 | 9/2001 | Chengalvarayan | 704/219 |
| 6,347,295 B1 * | 2/2002 | Vitale et al. | 704/209 |
| 6,405,168 B1 | 6/2002 | Bayya et al. | 704/256 |
| 6,411,932 B1 * | 6/2002 | Molnar et al. | 704/260 |
| 6,415,256 B1 | 7/2002 | Ditzik | 704/231 |
| 6,442,519 B1 | 8/2002 | Kanevsky et al. | 704/243 |
| 6,446,039 B1 | 9/2002 | Miyazawa et al. | 704/255 |
| 6,456,965 B1 | 9/2002 | Yeldener | 704/207 |
| 6,526,380 B1 | 2/2003 | Thelen et al. | 704/251 |
| 6,593,956 B1 | 7/2003 | Potts et al. | 348/14.09 |
| 6,629,073 B1 | 9/2003 | Hon et al. | 704/256.4 |
| 6,662,160 B1 | 12/2003 | Chien et al. | 704/256 |
| 6,671,666 B1 | 12/2003 | Ponting et al. | 704/233 |
| 6,671,668 B2 | 12/2003 | Harris | 704/246 |
| 6,671,669 B1 | 12/2003 | Garudadri et al. | 704/255 |
| 6,681,207 B2 | 1/2004 | Garudadri | 704/256 |
| 6,721,699 B2 | 4/2004 | Xu et al. | 704/207 |
| 6,738,738 B2 * | 5/2004 | Henton | 704/2 |
| 6,757,652 B1 | 6/2004 | Lund et al. | 704/254 |
| 6,801,892 B2 | 10/2004 | Yamamoto | 704/256 |
| 6,832,190 B1 | 12/2004 | Junkawitsch et al. | 704/255 |
| 6,868,382 B2 | 3/2005 | Shozakai | 704/254 |
| 6,901,365 B2 | 5/2005 | Miyazawa | 704/256 |
| 6,907,398 B2 | 6/2005 | Hoege | 704/265 |
| 6,934,681 B1 | 8/2005 | Emori et al. | 704/250 |
| 6,963,836 B2 | 11/2005 | Van Gestel | 704/251 |
| 6,980,952 B1 | 12/2005 | Gong | 704/234 |
| 7,003,460 B1 | 2/2006 | Bub et al. | 704/256 |
| 7,043,431 B2 * | 5/2006 | Riis et al. | 704/259 |
| 7,107,216 B2 * | 9/2006 | Hain | 704/260 |
| 7,133,535 B2 | 11/2006 | Huang et al. | 382/100 |
| 7,139,707 B2 | 11/2006 | Sheikhzadeh-Nadjar et al. | 704/243 |
| 7,269,556 B2 | 9/2007 | Kiss et al. | 704/245 |
| 7,472,061 B1 | 12/2008 | Alewine et al. | |
| 7,590,533 B2 * | 9/2009 | Hwang | 704/231 |
| 7,966,173 B2 * | 6/2011 | Emam et al. | 704/9 |
| 8,032,377 B2 * | 10/2011 | Massimino | 704/260 |
| 8,069,045 B2 * | 11/2011 | Emam et al. | 704/256 |
| 2002/0049591 A1 * | 4/2002 | Hain | 704/243 |
| 2002/0069063 A1 * | 6/2002 | Buchner et al. | 704/270 |
| 2002/0116196 A1 | 8/2002 | Tran | 704/270 |
| 2003/0033145 A1 | 2/2003 | Petrushin | 704/236 |
| 2003/0177006 A1 | 9/2003 | Ichikawa et al. | 704/231 |
| 2004/0059576 A1 | 3/2004 | Lucke | 704/256.7 |
| 2004/0078195 A1 | 4/2004 | Oda et al. | 704/207 |
| 2004/0088163 A1 | 5/2004 | Schalkwyk | 704/251 |
| 2004/0220804 A1 | 11/2004 | Odell | 704/230 |
| 2005/0010408 A1 | 1/2005 | Nakagawa et al. | 704/240 |
| 2005/0038655 A1 | 2/2005 | Mutel et al. | 704/256 |
| 2005/0065789 A1 | 3/2005 | Yacoub et al. | 704/231 |
| 2005/0187758 A1 | 8/2005 | Khasin | |
| 2005/0286705 A1 | 12/2005 | Contolini et al. | 379/265.02 |
| 2006/0020462 A1 | 1/2006 | Reich | 704/254 |
| 2006/0020463 A1 * | 1/2006 | Reich | 704/257 |
| 2006/0031069 A1 * | 2/2006 | Huang et al. | 704/243 |
| 2006/0031070 A1 | 2/2006 | Abrego et al. | 704/243 |
| 2006/0178876 A1 | 8/2006 | Sato et al. | 704/225 |
| 2006/0195319 A1 * | 8/2006 | Prous Blancafort et al. | 704/235 |
| 2006/0224384 A1 | 10/2006 | Dow et al. | 704/257 |
| 2006/0229864 A1 | 10/2006 | Suontausta et al. | 704/8 |
| 2006/0277032 A1 | 12/2006 | Hernandez-Abrego et al. | 704/9 |
| 2007/0005206 A1 * | 1/2007 | Zhang et al. | 701/36 |
| 2007/0015121 A1 * | 1/2007 | Johnson et al. | 434/156 |
| 2007/0082324 A1 * | 4/2007 | Johnson et al. | 434/156 |
| 2007/0112566 A1 | 5/2007 | Chen | 704/240 |
| 2007/0198261 A1 | 8/2007 | Chen | 704/240 |
| 2007/0198263 A1 | 8/2007 | Chen | 704/246 |
| 2007/0233487 A1 * | 10/2007 | Cohen et al. | 704/255 |
| 2008/0052062 A1 | 2/2008 | Stanford | 704/8 |
| 2008/0294441 A1 * | 11/2008 | Saffer | 704/255 |
| 2009/0024720 A1 | 1/2009 | Karray et al. | 709/219 |
| 2009/0076821 A1 * | 3/2009 | Brenner et al. | 704/260 |

OTHER PUBLICATIONS

Steven B. Davis et al., "Comparison of Parametric Representations for Monosyllabic Word Recognition in Continuously Spoken Sentences"—IEEE Transactions on Acoustics, Speech, and Signal Processing, vol. ASSP 28, No. 4, p. 357-366, Aug. 1980.

G. David Forney, Jr., "The Viterbi Agorithm"—Proceeding of the IEEE, vol. 61, No. 3, p. 268-278, Mar. 1973.

(56) References Cited

OTHER PUBLICATIONS

Kai-Fu Lee et al., "Speaker-Independent phone Recognition Using Hidden Markov Models"—IEEE Transaction in Acoustics, Speech, and Signal Processing, vol. 37, No. 11, p. 1641-1648, Nov. 1989.

Hans Werner Strube, "Linear Prediction on a Warped Frequency Scale,"—The Journal of the Acoustical Society of America, vol. 68, No. 4, p. 1071-1076, Oct. 1980.

Leonard E. Baum et al., "A Maximization Technique Occurring in The Statistical Analysis of Probabilistic Functions of Markov Chains,"—The Annals of Mathematical Statistics, vol. 41, No. 1, p. 164-171, Feb. 1970.

Rohit Sinha et al., "Non-Uniform Scaling Based Speaker Normalization" 2002 IEEE, May 13, 2002, vol. 4, pp. I-589-I-592.

Li Lee et al., "Speaker Normalization Using Efficient Frequency Warping Procedures" 1996 IEEE, vol. 1, pp. 353-356.

Vasilache, "Speech recognition Using HMMs With Quantized Parameters", Oct. 2000, $6^{th}$ International Conference on Spoken Language Processing (ICSLP 2000), pp. 1-4.

Bocchieri, "Vector Quantization for the Efficient Computation of Continuous Density Likelihoods", Apr. 1993, International conference on Acoustics, Speech, and Signal Processing, IEEE, pp. 692-695.

Claes et al. "A Novel Feature Transformation for Vocal Tract Length Normalization in Automatic Speech Recognition", IEEE Transformations on Speech and Audio Processing, vol. 6, 1998, pp. 549-557.

M. Tamura et al. "Adaptation of Pitch and Spectrum for HMM-Based Speech Synthesis Using MLLR", proc of ICASSP 2001, vl. 1, pp. 1-1, May 2001.

Cherif A, "Pitch and Formants Extraction Algorithm for Speech Processing," Electronics, Circuits and Systems, 2000, ICECS 2000. The 7th IEEE International Conference on vol. 1, Dec. 17-20, 2000, pp. 595-598, vol. 1.

L. Lee, R. C. Rose, "A frequency warping approach to speaker normalization," in IEEE Transactions on Speech and Audio Processing, vol. 6, No. 1, pp. 49-60, Jan. 1998.

W. H. Abdulla and N. K. Kasabov. 2001. Improving speech recognition performance through gender separation. In Proceedings of ANNES, pp. 218-222.

Iseli, M., Y. Shue, and A. Alwan (2006). Age- and Gender-Dependent Analysis of Voice Source Characteristics, Proc. ICASSP, Toulouse.

U.S. Appl. No. 61/153,267 entitled "Multiple Language Voice Recognition", filed Feb. 17, 2009.

"Cell Broadband Engine Architecture", copyright International Business Machines Corporation, Sony Computer Entertainment Incorporated, Toshiba Corporation Aug. 8, 2005.

International Search Report and Written Opinion dated Mar. 19, 2010 issued for International Application PCT/US10/23098.

International Search Report and Written Opinion dated Mar. 22, 2010 issued for International Application PCT/US10/23102.

International Search Report and Written Opinion dated Apr. 5, 2010 issued for International Application PCT/US10/23105.

Japanese Non-Final Notification of Reasons for Refusal mailed date Feb. 26, 2013 issued for Japanese Patent Application No. 2011-551105.

Extended Search Report dated Nov. 27, 2012 in European Patent Application No. 107444128.9.

Viet-Bac Le et al: "First Steps in Fast Acoustic Modeling for a New Target Language: Application to Vietnamese", 2005 IEEE International Conference on Acoustics, Speech, and Signal Processing Mar. 18-23, 2005—Philadelphia, PA, USA, IEEE, Piscataway, NJ, vol. 1, Mar. 18, 2005, pp. 821-824, XP010792164, DOI: 10.1109/ICASSP.2005.1415240 ISBN: 978-0-7803-8874-1.

Khe Chai Sim et al: "Robust phone set mapping using decision tree clustering for cross-lingual phone recognition", Acoustics, Speech and Signal Processing, 2008. ICASSP 2008. IEEE International Conference on, IEEE, Piscataway, NJ, USA, Mar. 31, 2008, pp. 4309-4312, XP031251550, ISBN: 978-1-4244-1483-3.

\* cited by examiner

MULTIPLE LANGUAGE VOICE RECOGNITION

CROSS-REFERENCE TO RELATED APPLICATION

This application claims the benefit of priority of U.S. provisional application No. 61/153,267, entitled MULTIPLE LANGUAGE VOICE RECOGNITION, filed Feb. 17, 2009, the entire disclosures of which are incorporated herein by reference.

FIELD OF INVENTION

Embodiments of the present invention relate generally to computer-implemented voice recognition, and more particularly, to a speech recognition method and apparatus that accounts for the possibility that native speakers of different languages may pronounce a given word differently.

BACKGROUND OF INVENTION

In the field of computer speech recognition a speech recognition system receives an audio stream and filters the audio stream to extract and isolate sound segments that make up speech. The sound segments are sometimes referred to as phonemes. The speech recognition engine then analyzes the phonemes by comparing them to a defined pronunciation dictionary, grammar recognition network and an acoustic model.

Sublexical speech recognition systems are usually equipped with a way to compose words and sentences from more fundamental units. For example, in a speech recognition system based on phoneme models, pronunciation dictionaries can be used as look-up tables to build words from their phonetic transcriptions. A grammar recognition network can then interconnect the words.

A data structure that relates words in a given language represented, e.g., in some graphical form (e.g., letters or symbols) to particular combinations of phonemes is generally referred to as a Grammar and Dictionary (GnD). An example of a Grammar and Dictionary is described, e.g., in U.S. Patent Application publication number 20060277032 to Gustavo Hernandez-Abrego and Ruxin Chen entitled Structure for Grammar and Dictionary Representation in Voice Recognition and Method For Simplifying Link and Node-Generated Grammars, the entire contents of which are incorporated herein by reference.

One problem often encountered in applications that use Speech Recognition is that native speakers of different languages may pronounce the same written word differently. For example, words in both Mandarin and Cantonese are represented by the same Chinese characters. Each character corresponds to the same meaning in both Mandarin and Cantonese, but the word corresponding to the character is pronounced differently in the two languages. In software applications marketed to speakers of both languages that use speech recognition it would be desirable for the speech recognition system to be able to handle speakers of both languages.

A related problem is that in many contexts, e.g., song titles, relevant word combinations, may contain words from different languages. A speaker's pronunciation of a given song title containing both English and Italian words may vary depending on the speaker's native language is English or Italian as well as the speaker's familiarity with a non-native language. It would be desirable for speech recognition systems to handle this situation.

Although it is possible for a GnD to associate multiple pronunciations with a given word, manually generating such a GnD in a way that takes into account pronunciation differences due a speaker's native language is a labor-intensive and time-intensive process.

It is within this context that embodiments of the current invention arise.

DESCRIPTION OF THE SPECIFIC EMBODIMENTS

Figure 1:
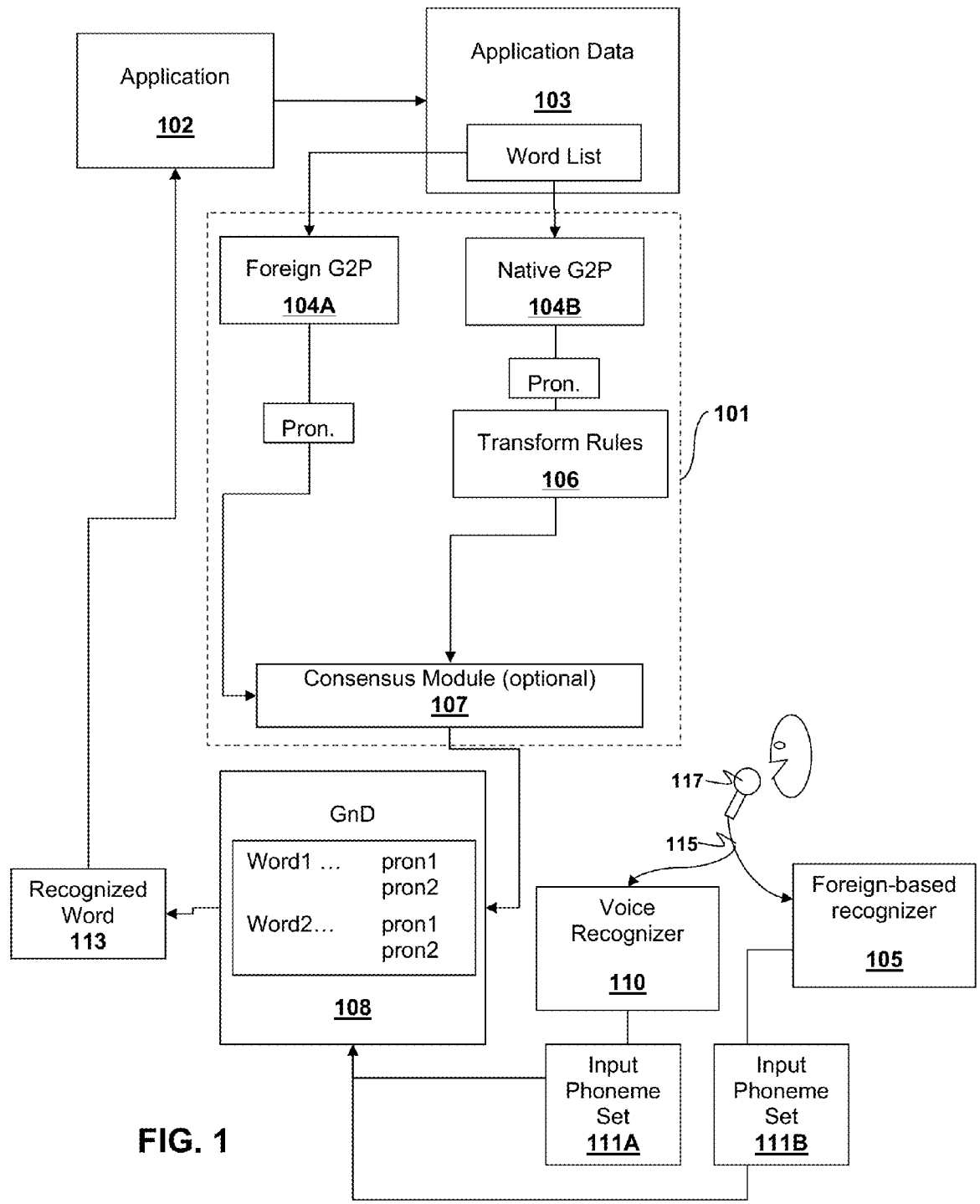
FIG. 1 is a block diagram illustrating computer speech processing according to an embodiment of the present invention.

Embodiments of the invention provide for voice recognition systems and methods that can handle multiple pronunciations for a hybrid of two or more different languages.

Embodiments of the present invention provide an efficient, self-contained and small foot-print method and system for cross-language Grapheme to Phoneme conversion (G2P) that includes pronunciation refining. This method may be used in a voice recognition system to generate an optimized set of pronunciations in a target language from words that might come from a different language, referred here as orthographic language. Pronunciations for both source and target languages may be generated in parallel and then consolidated on an extended set of pronunciations given in the phonemes of the target language. These pronunciations can be used as part of a voice response system for speech recognition or text-to-speech conversion. The grapheme to phoneme (G2P) conversion may be based on a graphone framework that generates multiple possible pronunciations for each word. Excess pronunciations generated may be refined using a "center" pronunciation created by consensus among the set of pronunciations.

The basics of a grapheme to phoneme (G2P) conversion method are described, e.g., in US Patent Application Publication number 20060031069 entitled "System And Method For Efficiently Performing A Grapheme-To-Phoneme Conversion Procedure" by Jun Huang, Gustavo Hernandez-Abrego and Lex Olorenshaw, the entire contents of which are incorporated herein by reference.

According to an embodiment of the invention, a GnD that can handle more than one language at the same time may be generated automatically. Embodiments of the present invention utilize an improved data structure and process for handling a Grammar and Dictionary (GnD) for multiple language voice recognition. The data structure that can associate multiple pronunciations with each orthographic word in the GnD based on different language classifications. These classifications include the following:

Orthographic Language is the language of origin of a word in the GnD.

Display Language is the language used by a graphical display that displays the words. The display language generally refers to the encoding of a data string (e.g., an ASCII string) for each word as it is displayed. The encoding causes a given string to be displayed in a particular graphical format, e.g., the Roman, Greek, Arabic, Hebrew, Russian, or other alphabet, traditional Chinese characters, simplified Chinese characters and the like. The orthographic language generally depends on the display language, though it is possible for two or more languages to be mapped to the same display language.

Phoneme Language—the language that determines a particular set of acoustic phonemes used to determine the pronunciation. Different languages typically use different sets of phonemes. Therefore, to automate the process of generating a pronunciation automatically, it is useful to know the phoneme set Pronunciation Language—the language used as a basis for determining pronunciation. The pronunciation language may be based on an assumption about the speaker's native language. In the discussion below, the following notation is used. For a native speaker of a language the word the name of the language is followed by the word "native" in parentheses. Thus, for the pronunciation of a Spanish word by native speaker of Spanish, the pronunciation language would be indicated as Spanish (native). For the pronunciation of a word in a second language by a native speaker of a first language, the pronunciation language would be indicated as First Language-Second Language. Thus, for the pronunciation of a Spanish word by native speaker of English, the pronunciation language would be indicated as Spanish-English. The pronunciation language for an English word by a native Spanish speaker would be English-Spanish.

Target Language—the language relevant to the context of the software application that uses the voice recognition system/method. The application language may be the same as the orthographic language in many contexts. However, in some contexts, a hybrid or application-specific language may be used.

Embodiments of the invention utilize these different language classifications to automatically generate a GnD having multiple possible pronunciations associated with a given word in the target language to provide the GnD good word recognition performance.

As seen in FIG. 1, computer speech processing may be performed by a pronunciation generator 101 that operates in conjunction with a computer application 102 running on a computer processing unit. The application 102 may generate or receive data 103 that includes a list of words that may be recognized by a voice recognizer 110. The pronunciation generator 101 matches selected words from a word list in the application data 103 to one or more corresponding pronunciations. The operations of the pronunciation generator 101, application 102 and voice recognizer 110 may be implemented in hardware, software or a combination of both hardware and software.

By way of example, these features of the pronunciation generator 101 may be implemented by one or more computer programs may be stored in a computer memory unit in the form of instructions that can be executed on the processing unit. The instructions of the program may be configured to implement, amongst other things, certain parts of a speech processing method that involves converting an input word from the application data 103 into one or more pronunciations and wherein each pronunciation includes a set of one or more phonemes and associating each pronunciation of the one or more pronunciations with the input word in an entry in a computer database 108. Each phoneme represents a sound in a pronunciation of the input word by a speaker of the first or second language and the database entry includes information identifying a pronunciation language and/or a phoneme language for each pronunciation.

Embodiments of the present invention may use a combination of integrated technologies with intermediate steps, adaptations and transformations to facilitate recognition one or more foreign languages in automated speech recognition. Embodiments of the present invention handle foreign word recognition using a mixed hybrid integrated recognition strategy. By way of example, foreign English words can be recognized by combining a native language recognizer with a foreign language recognizer and using intermediate steps to cover different possible ways in which one could pronounce a word a foreign language. Although the example that follows focuses on "English" spoken by native Spanish Speakers, the techniques described here can also be used for other combinations of languages.

By way of non-limiting example, consider a case in which the name of the Australian performer: "Kylie Minogue" is recognized by native Spanish speakers using an English based recognizer (foreign recognizer for Spanish people) and a Spanish based recognizer (native recognizer for Spanish people) at the same time.

Normally, in the literature, English recognition by foreign speakers is performed using only an English recognizer that has been adapted for foreign speakers. Although this approach is very suitable for speakers with very good English pronunciation it is considerably less robust when the speaker has a strong accent or limited familiarity with the English language. In this case, a better approach would be to use an integrated system or a system combination that includes both an English recognizer and a Native recognizer in conjunction with certain other intermediate steps. This strategy tries to cover and model the English target pronunciation and the native initial pronunciation and tries to account for different ways a foreign speaker may attempt to pronounce words in a non-native language. Different strategies may be used to deploy an integrated hybrid recognizer to cover the different levels of non-native language knowledge that a foreign speaker may have. To illustrate this approach, some non limiting examples of this approach are discussed below.

1) For very initial learners having little ability to read in English, a good strategy could be to generate pronunciations using a foreign G2P. In this example a Foreign (e.g., Spanish) G2P 104A and a foreign-based (e.g., Spanish) recognizer 105 may be used to recognize English words. In the case of English and Spanish, the pronunciation generator 101 generates Spanish pronunciations through Spanish G2P conversion, based on Spanish pronunciations, of English words. 2) The next step in learning a non-native language is "knowing how to read but not yet knowing how to pronounce". For speakers that read English and identify the foreign pronunciation but utter English words using their native phoneme system it is a better strategy to use the foreign-based (e.g., Spanish) recognizer 105. However, the pronunciation in this case will be generated with the native G2P 104B but with transformed pronunciations. In this case the speaker's pronunciation may be modeled assuming that such speaker knows "the English way of speaking" and can read English but still uses her native phoneme system. By way of example, many English learners in Europe may stay in this stage if they can read English and only occasionally speak and listen to English. The pronunciation generator 101 may generate pronunciations automatically for such speakers using two components: A G2P corresponding to the orthographic (native) language (e.g., English) 104B and Phoneme Transformation Rules 106 between the orthographic and target languages, in case of recognizing English words spoken by a Spanish speaker. The English phonemes are transformed to Spanish phonemes according to the Transformation Rules 106.

Transforming English pronunciations of entire words into corresponding native Spanish pronunciations with conventional methods is a challenging, laborious and time-consuming task. The pronunciations could be generated using expert knowledge. However, in certain embodiments of the present invention these corresponding pronunciations may be generated automatically by transforming the phonemes of the Orthographic language (e.g., English) to the corresponding phonemes in the target language (e.g., Spanish). The following example illustrates how some general rules can be applied to do the phoneme transformation automatically, thereby saving manual work and that can be applied to new words.

Here are some examples of phoneme transformation rules 106 that may be used for transforming English phonemes to Spanish phonemes. English phonemes are labeled with '//EN' and Spanish phonemes with '//SP':

a) Phonemes that exist in both languages may be transformed 1 by 1 to its equivalent phoneme. For example, the English phoneme "1" may be transformed into the equivalent Spanish phoneme "1". Both languages have versions of the phoneme regarded as "1" that may be articulated differently but are similar in essence (this concept is known in the literature as "allophones").

b) Phones that do not exist in the target language are mapped by the acoustically closest phone or using written information:

b.1) For example the English phoneme regarded as "hh//EN" does not exist in Spanish and it is transformed into the Spanish phoneme "x//SP" because, based on certain criteria, it can be defined that "x//SP" is the closest Spanish phoneme to "hh//EN". Distance measures, confusion or recognition information or expert knowledge can be used as criteria to map phonemes from one language to another.

b.2) When the English central vowels (ax//EN, ah//EN, uh//EN) do not exist in the native phoneme system they may be transformed using English written information. For example, the central English phoneme known as the schwa (•) "ax//EN" does not exist in Spanish and is transformed into a Spanish vowel using information coming from the orthography of the English word. An instance of a conversion rule that considers the orthography could be: an English word when written with the characters 'a', 'e', 'i', 'o', 'u' or 'io' and such orthography is associated to one of the English central vowels, that does not exist in the target language, the English central vowel is transformed into the phonemes in the target language "a", "e", "i", "o", "u" or "jo", respectively. Notice that in the previous discussion single quotes (') have been used to denote orthographies and double quotes (") for phonemes. This rule can be applied because foreign speakers tend to reduce to their own vowel system.

As a first example, the English word 'water' in English may be transcribed into the English phoneme set "w//EN ax//EN t//EN er//EN". Using the Spanish phoneme set this may be transformed into "w//SP a//SP t//SP e//SP r//SP". The English schwa "ax//EN" is transformed in Spanish to "a//SP" because the schwa represents the sound corresponding to the character 'a' in 'water'.

As a second example, the English word 'the' can be transcribed in English as "dh//EN ax//EN" or "dh//EN ah//EN". Using the Spanish phoneme set this may be transformed into "d//SP e//SP". In this case the English schwa "ax//EN" or the phoneme "ah//EN" associated to the character 'e', can both be transformed into the Spanish phoneme "e//SP". In this example, the English phoneme "dh//EN" has been transformed to the Spanish phoneme "d//SP" because it is the closest Spanish phoneme from an acoustic standpoint.

As a third example, in the English word 'station' the English schwa phoneme "ax//EN" may be transformed this time into the Spanish diphthong "j//SP o//SP".

Station: s//EN t//EN ey//EN sh//EN ax//EN n//EN (Original English transcription)

Station: e//SP s//SP t//SP e//SP j//SP s//SP j//SP o//SP n//SP (transformed Spanish transcription)

The "ax//EN" represent the English letters 'io' and is transformed and pronounced in Spanish by "j//SP o//SP".

The main reason for the transformation rule above is that Spanish speakers learn English using English written information and often are unable to distinguish the English schwa (which does not exist in Spanish) so they reduce it to their native pronunciation style. In a recognizer this transformation rule can be applied automatically by means of conditional rules that also take into account the orthography. In another example, Italian Speakers may follow also this same pattern because the schwa, and other central vowels, do not exist in Italian as well. Consequently, techniques similar to those described above can also be applied to generate pronunciations of English words by native speakers of Italian.

c) Other automatic transformation rules can be also applied. Tried and tested phonological rules of the target language can be applied when transforming the pronunciations of the orthographic language. Continuing with the Spanish to English example, in Spanish the sequences of phonemes "s//SP t//SP", "s//SP p//SP" and "s//SP k//SP" are in fact pronounced "e//SP s//SP t//SP", "e//SP s//SP p//SP" and "e//SP s//SP k//SP". When Spanish speakers speak English they tend to apply this rule. In the previous case, the word 'Station' begins with the English phonemes "s//EN t//EN" that can be transformed into the Spanish phonemes "e//SP s//SP t//SP" following this phonological rule.

By way of example, the English phone set (TIMIT style) may be mapped into the Spanish phone set (SAMPA Style): as follows:

English Phone → Spanish Phone
Vowels:
aa//EN → a//SP
ae//EN -> a//SP
e//EN -> e//SP
Ih//EN -> I//SP
Iy//EN -> I//SP
Ao//EN -> o//SP
uw//EN -> u//SP
diphthongs:
aw//EN -> a w//SP
ow//EN -> o w//SP
ey//EN -> e j//SP
...
Central vowels:
ax//EN -> a//SP, e//SP , I//SP , o//SP , u//SP, j//SP o//SP (depending in the English written system)
ah//EN -> a//SP, e//SP , o//SP (depending in the English written system)
uh//EN -> a//SP, u//SP , o//SP (depending in the

```
English written system)
Acoustic closest phones:
sh//EN -> s//SP or tS//SP
dh//EN -> d//SP
hh//EN -> x//SP
jh//EN -> j//SP or jj//SP
v//EN -> B//SP or b//SP
Other English phone have Spanish equivalent phone and
are transformed 1 by 1, e.g.:
p//EN -> p//SP,
t//EN -> t//SP
s//EN -> s//SP
    ... .
Phonological rules:
s//EN t//EN → e//SP s//SP t//SP
    ... .
```

Combinations of 1) and 2) are also possible. For example, foreign acronyms can be said using either the native transcription rules or the English transcription rules. Thus, the acronym U2 may be pronounced as either 'u dos' or 'you two'. Consequently both pronunciations may be mapped to the acronym that is displayed as 'U2' by the application using the speech recognition system described herein.

3) For Speakers that have a higher level of familiarity with the English language, some of the transformations can also be applied to an English voice recognizer 110 directly. This can also be done in combination with other known techniques such as HMM adaptation, integrate HMM training, intermediate phone merging. Alternatively, the transformation rules may allow for the use of some non-native phones that are more easily learned ("sh//EN", "v//EN" . . . ).

Not only rules based methods but Data driven methods can also be used to generate pronunciations that try to properly model non-native speech of foreign speakers in an intermediate learning stage. In the process of learning a foreign language, intermediate learner speakers try to approximate "the way they speak" and try to mimic as close as possible the foreign language. At this stage a "rules based system" does not model the high degree of existing variability. Foreign speakers try also to speak a non-native language using "acoustic similarity knowledge and even random best guess", not only written rules. For example, speakers will try to mimic acoustic closed foreign pronunciations as an alternative to written based rules pronunciations.

In the previous example of the word 'water', some non-native Spanish speakers would try to say not only "w//SP a//SP t//SP e//SP r//SP". Alternatively they may try also the pronunciation: "w//SP o//SP t//SP e//SP r//SP". The phones "a//SP" and "o//SP" are acoustically very close to each other in Spanish and acoustically very close to the English schwa "ax//En". Some Spanish speakers may also be able to mix the two language phone sets and may be able to produce cross language pronunciations like: "w//SP ax//EN t//SP e//SP r//SP". Some speakers may also be able to generate pronunciations with intermediate phone sets of the two languages.

The alternative acoustic based pronunciations can be generated using similarity models like distance measures, pattern matching systems . . . or, acoustics confusion knowledge. Once automatically generated, the pronunciations can be validated and selected using a real speech database and real recordings of non-native speakers.

4) For speakers with a very high level of proficiency in English, the pronunciation generator may use a purely English system, i.e., native G2P 104B for pronunciation generation and native voice recognizer 110.

Finally, Combinations and integration of combinations involving some or all the strategies described above with respect to strategies 1), 2), 3), and 4) can be used in a unique integrated system to cover all the levels of ability of a foreign speaker to speak a non-native language. In this way, the pronunciation generator 101 will generate two or more pronunciations (native plus foreign) for each given word.

When dealing with word sequences like phrases or sentences, it is not difficult to see that the number of pronunciations can get out of control. If two pronunciations may be needed for one word, four pronunciations will be needed for a sequence of two words and eight for a sequence of three words. For the sake of practicality, a pronunciation refinement may be needed as part of the pronunciation generator 101. By way of example, the pronunciation generator 101 may include an optional consensus module 107 that refines the pronunciation mapping of entries in the database 108 by discarding unlikely, redundant, or invalid pronunciations. The basics of a similar pronunciation refinement that utilizes a consensus module are described in US Patent Application Publication number 20060031070 entitled "System and Method For Efficiently Implementing A Refined Dictionary For Speech Recognition" by Gustavo Hernandez-Abrego and Lex Olorenshaw, the entire contents of which are incorporated herein by reference.

The consensus module 107 may perform multiple sequence alignment procedures by aligning corresponding phonemes from pronunciation for each input word. The consensus module 107 may define a "center" pronunciation among the possible multiple pronunciations of a word to refine and discard pronunciations that might be spurious to the voice recognition system 110. By way of example, two center pronunciations may be generated from a consensus of the two sets of pronunciations (orthographic and target languages) and those pronunciations in each set that lie too far away for consensus may be eliminated. In a preferred embodiment, the consensus module 107 may use a Multiple Sequence Alignment (MSA) step to find a consensus among the orthographic and target sets of pronunciation. MSA is a common tool in computational biology but it is not yet a widespread technique in speech and language technologies.

In some embodiments, transformation rules 106 may transform a set of phonemes from one language to another through use of a set of intermediate phonemes that are used to multiple languages. The intermediate phonemes of such a set are sometimes referred to herein as "phoneme classes". The phoneme classes may be determined from the phonetics of multiple languages. Phoneme classes may be determined by an application based on the application's need. It is usually advisable to group together phonemes of similar sound characteristic. This intermediate mapping of phonemes allows a mapping of phonemes from any source language to any target language provided the phonemes of each language of interest for G2P are mapped to the intermediate phonemes.

According to an embodiment of the present invention, a speech processing system, e.g., as shown in FIG. 1 may be configured to automatically generate pronunciations in hybrid languages based on the orthographic language of an input word and mapping information for mapping phonemes of a native pronunciation of the word to a non-native pronunciation.

Figure 2A:
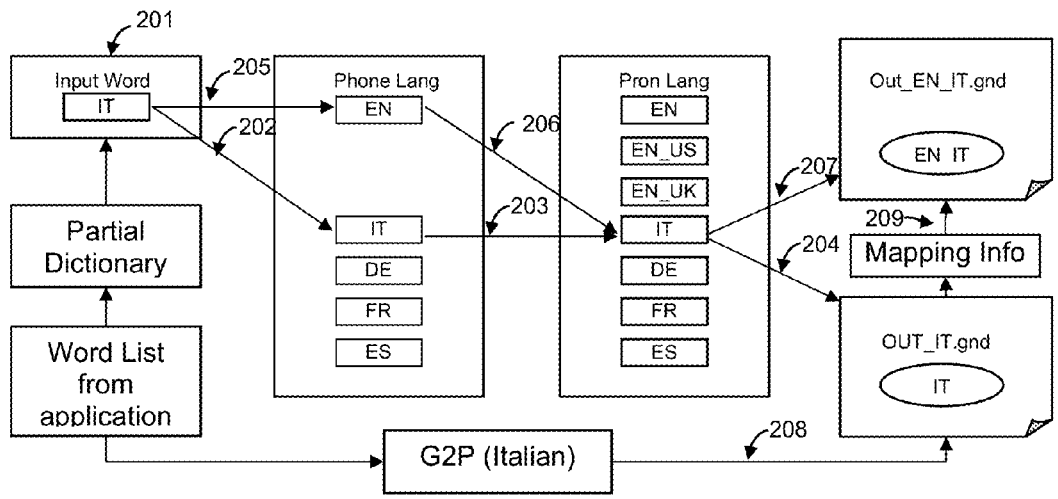
FIG. 2A is a diagram illustrating a computer processing method in accordance with an embodiment of the present invention.

By way of non-limiting example, as illustrated in FIG. 2A, suppose that the orthographic language for the input word is Italian and the target languages for the word are Italian and a hybrid language English-Italian (English as pronounced by a native Italian speaker). In some cases, the word recognizer may have a partial dictionary of words and their pronunciations in English (native), Italian (native), English-Italian and Italian-English. Each of the words in the partial dictionary is characterized by a pronunciation language and a phoneme language. A method for generation of a pronunciation mapping for the input word may proceed as follows.

201) The input Italian orthographic word may be compared to the entries in the partial dictionary to see if there is a match to any word in the partial dictionary.
202) If there is a match, check if the phoneme language for the matched word is Italian. If so, the method proceeds to 203)
203) Check if the Pronunciation Language for the matched word is Italian. If so, the method proceeds to 204)
204) Output the word and its non-blank pronunciation(s) to the Italian (native) GnD. Otherwise:
205) For the same matched word in 1) check if the phoneme language is English. If so, the method proceeds to 206).
206) Check if the pronunciation language for the word is Italian. If so, the method proceeds to 207).
207) Output the word and its non-blank pronunciation(s) to the English-Italian GnD.
208) If the word did not pass through to 204) and 207) (i.e., there is no Italian pronunciation for the input word) the method tries to predict a pronunciation based on the orthographic language of the word. In the case of generating an Italian pronunciation, this may be done by performing an Italian G2P on the word and storing the resulting pronunciation in the Italian GnD.

If an English-Italian pronunciation cannot be generated at 207) based on the orthographic language of the word based on the application's need, a pronunciation may be generated using mapping information that maps Italian phonemes to English phonemes, e.g., as described above. Specifically, the pronunciation of Italian orthographic word obtained from 204) or 207) may be broken up into its constituent phonemes for pronunciation by a native Italian speaker. Each phoneme that makes up the word is mapped to one or more corresponding English phonemes. Such mapping may be done by a direct mapping of Italian phonemes to corresponding English phonemes (if one exists). Alternatively, a mapping may be generated by way of the phoneme classes, as discussed above. The resulting set of English phonemes and the corresponding Italian word may then be included in the English-Italian GnD. Since some of the Italian phonemes in the word may be mapped to two or more English phonemes, there may be more than one English-Italian pronunciation. However, the data structure may allow for one-to-many mappings to handle these different pronunciations.

In some special situations, a mixture of more than two phoneme languages could exist in one pronunciation entry. The entry can still be labeled as of EN Phone Lang or IT Phone Lang based on what phoneme language plays more important role for the entry. The previous processing may still be applied to generate the final GnD with a mixed Phoneme Lang in a single entry. An example of such an entry is:

Station: s//EN t//EN ey//EN sh//EN e//SP n//EN

The acoustic model used for "e//SP" of the left context phoneme of "sh//EN" and right context "n//EN" is the native Spanish model of "e//SP" of the left context phone "x//SP" and right context "n//SP". This is assuming the phoneme classes defined by the application maps "sh/EN" to "x//SP", "n//EN" to "n//SP".

In some embodiments, the process illustrated in FIG. 2A may be modified to allow for automatic generation of multiple pronunciations of a single orthographic word based on the speaker's accent. Specifically, suppose it is desired to generate a GnD for a target language referred to herein as International English (EN_IL), which accounts for differences in pronunciation of English words by Native US speakers (EN_US) and Native UK speakers (EN_UK).

Figure 2B:
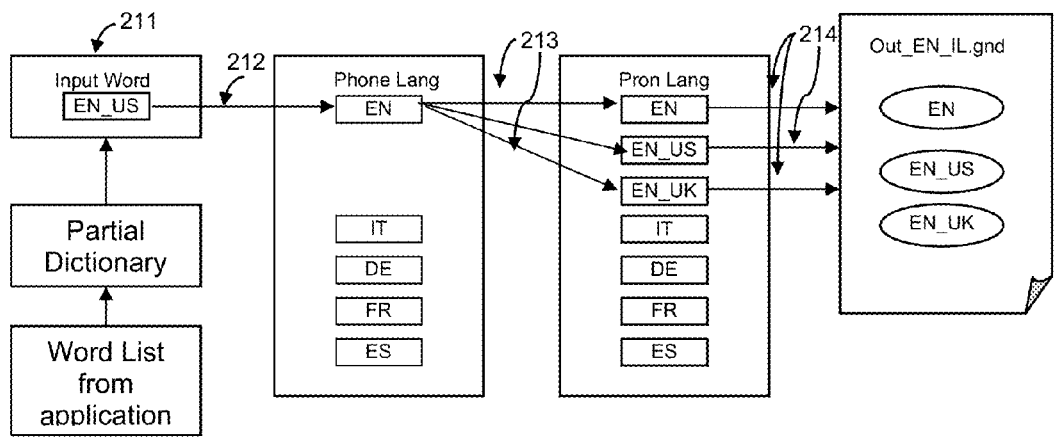
FIG. 2B is a flow diagram illustrating an example of a computer speech processing in accordance with an alternative embodiment of the present invention.

As illustrated in FIG. 2B, each word from a word list relevant to an application may be compared to a partial dictionary of words, each of which has an associated phoneme language and pronunciation language.

At 211) each word in the list is compared to the dictionary to find a matching entry.
At 212) it is determined if the Phoneme Language of the matching entry found in 211) is EN.
At 213) the matching entry is checked to make sure that the Pronunciation Language of the entry found in 211) is EN, EN_US, or EN_UK.
At 214) the matched and not blank pronunciations may be output to an International English GnD indicated as Out_EN_IL.gnd.

In some embodiments, the apparatus 100 may include a voice recognition module 110 and a foreign-based voice recognition module 105 that works in conjunction with the pronunciation generator 101. The voice recognition modules 110 and 105 may be implemented in hardware or software or some combination of both hardware and software. The voice recognition modules 110 and 105 receive a voice signal 115 that represents an utterance from a speaker SP. The voice signal 115 may be generated, e.g., using a microphone 117 to convert speech sounds from the speaker SP into an electrical signal using an electrical transducer. The electrical signal may be an analog signal, which may be converted to a digital signal through use of an analog to digital (A/D) converter. The digital signal may then be divided into a multiple units called frames, each of which may be further subdivided into samples. Each frame may be analyzed, e.g., using a Hidden Markov Model (HMM) to determine if the frame contains a known phoneme. The application of Hidden Markov Models to speech recognition is described in detail, e.g., by Lawrence Rabiner in "A Tutorial on Hidden Markov Models and Selected Applications in Speech Recognition" in Proceedings of the IEEE, Vol. 77, No. 2, February 1989, which is incorporated herein by reference in its entirety for all purposes.

Sets of input phonemes 111A, 111B determined from the voice signal 115 may be compared against multiple sets of phonemes (possibly from different languages) that make up pronunciations in the database 108. If a match is found between the phonemes from the voice signal 115 and a pronunciation in an entry in the database (referred to herein as a matching entry), the matching entry word 113 may correspond to a particular change of state of a computer apparatus that is triggered when the entry matches the phonemes determined from the voice signal.

As used herein, a "change of state" refers to a change in the operation of the apparatus. By way of example, a change of state may include execution of a command or selection of particular data for use by another process handled by the application 102. A non-limiting example of execution of a command would be for the apparatus to begin the process of selecting a song upon recognition of the word "select". A non-limiting example of selection of data for use by another process would be for the process to select a particular song for play when the input phoneme set matches the title of the song.

The voice recognition modules 110 and 105 may address conflicts between different words with the same or similar pronunciation. Consider the case of the English words 'worker' and 'work'. These words may be converted into phonemes as follows:

'worker'-w(ao|er)k er. MPL=4.

'work'-w er[k]. MPL=3.

The notation (ao|er) indicates that two possible phonemes may correspond to the combination 'or' in the orthographic word 'word'. The notation [k] indicates that the phoneme in brackets is optional. The notation MPL indicates the maximum pronunciation length for the word, which is the largest number of phonemes the word could have.

In some cases, two or more words with different maximum pronunciation lengths may have equally likely pronunciations. In such a case, the voice recognition modules 110 and 105 may reject the word having the longer pronunciation length if both are equally likely.

Figure 3:
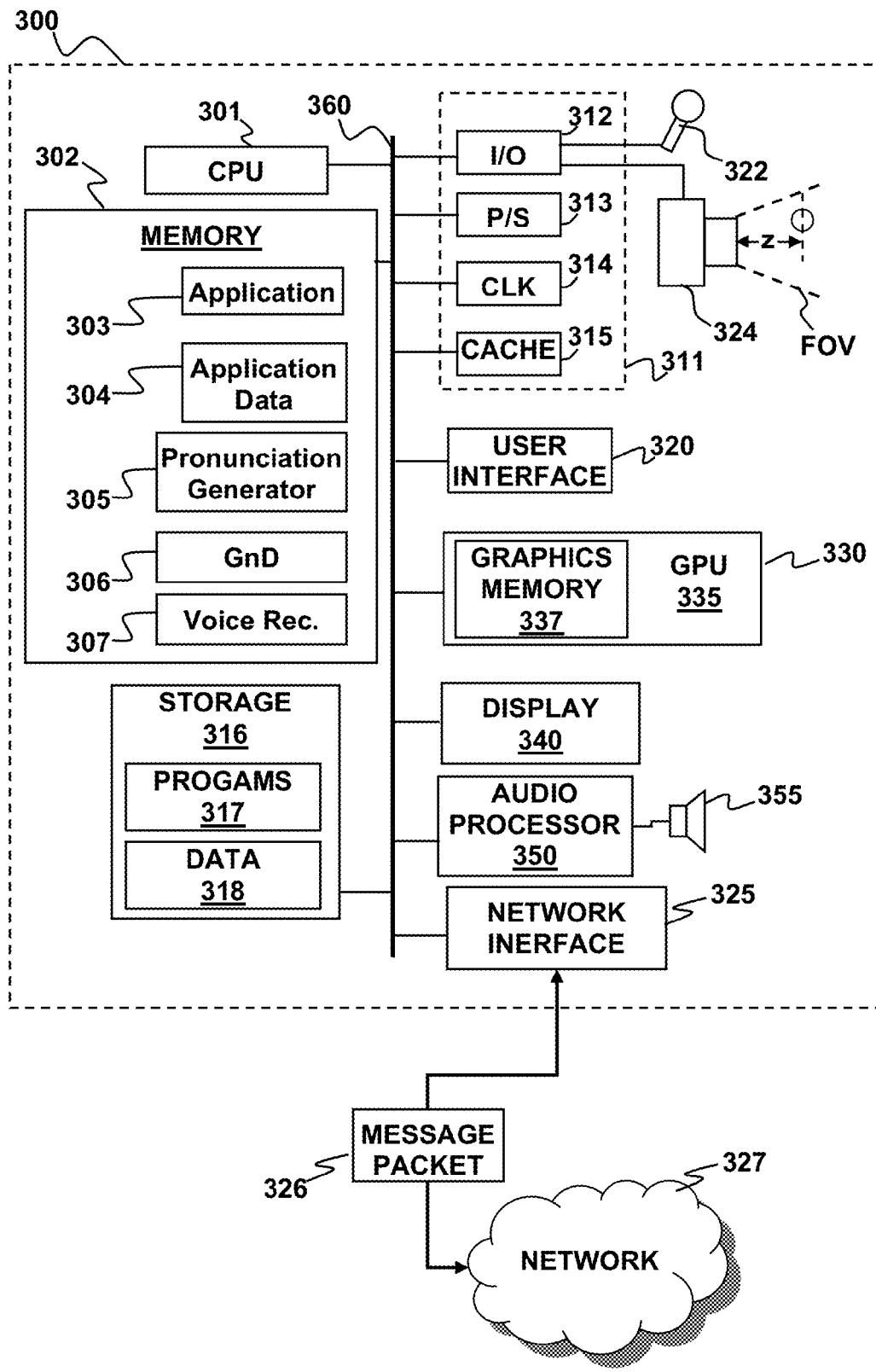
FIG. 3 is a block diagram of a computer speech processing apparatus according to an embodiment of the present invention.

A speech processing apparatus may be configured in accordance with embodiments of the present invention in any of a number of ways. By way of example, FIG. 3 is a more detailed block diagram illustrating a speech processing apparatus 300 according to an embodiment of the present invention. By way of example, and without loss of generality, the apparatus 300 may be implemented as part of a computer system, such as a personal computer, video game console, personal digital assistant, cellular telephone, hand-held gaming device, portable internet device or other digital device. In a preferred embodiment, the apparatus is implemented as part of a video game console.

The apparatus 300 generally includes a processing unit (CPU) 301 and a memory unit 302. The apparatus 300 may also include well-known support functions 311, such as input/output (I/O) elements 312, power supplies (P/S) 313, a clock (CLK) 314 and cache 315. The apparatus 300 may further include a storage device 316 that provides non-volatile storage for software instructions 317 and data 318. By way of example, the storage device 316 may be a fixed disk drive, removable disk drive, flash memory device, tape drive, CD-ROM, DVD-ROM, Blu-ray, HD-DVD, UMD, or other optical storage devices.

The processing unit 301 may include one or more processing cores. By way of example and without limitation, the CPU 302 may be a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

The memory unit 302 may be any suitable medium for storing information in computer readable form. By way of example, and not by way of limitation, the memory unit 302 may include random access memory (RAM) or read only memory (ROM), a computer readable storage disk for a fixed disk drive (e.g., a hard disk drive), or a removable disk drive.

The processing unit 301 may be configured to run software applications and optionally an operating system. Portions of such software applications may be stored in the memory unit 302. Instructions and data may be loaded into registers of the processing unit 302 for execution. The software applications may include a main application 303, such as a video game application. The main application 303 may operate in conjunction with application data 304 and speech processing software, which may include a pronunciation generator 305, a GnD 306, and a voice recognizer 307, portions of all of which may be stored in the memory 302 and loaded into registers of the processing unit 301 as necessary.

Through appropriate configuration of the foregoing components, the CPU 301 and pronunciation generator 305 may be configured to implement the speech processing operations described above with respect to FIG. 1, FIG. 2A and FIG. 2B. Specifically, the pronunciation generator 305 may include instructions that, upon execution, cause the processing unit 301 to convert an input word into one or more pronunciations and associating each pronunciation the input word in an entry in a computer database, such as the GnD 306, as described above. Each entry in the GnD 306 may include information identifying a pronunciation language and/or a phoneme language for each pronunciation of an input word from the application data 304. In a particular embodiment, the pronunciation generator 305 may be configured to perform grapheme to phoneme conversion for two or more languages in order automatically to produce hybrid pronunciations, e.g., as discussed above with respect to FIG. 1 and FIGS. 2A-2B.

The voice recognizer 307 may include a speech conversion unit configured to convert a sound signal produced by a speaker into a set of input phonemes. The sound signal may be converted to a digital signal via microphone 322 and A/D converter, which may be implemented, e.g., as part of the I/O function 312. The voice recognizer 307 may be further configured to compare the set of input phonemes to one or more entries in the GnD 306 and trigger the application 304 to execute a change of state corresponding to a database entry that includes a pronunciation that matches the set of input phonemes. Speech recognition may be made more robust through the generation multiple pronunciations for a given word based on language assumptions about the speaker.

The apparatus 300 may include a network interface 325 to facilitate communication via an electronic communications network 327. The network interface 325 may be configured to implement wired or wireless communication over local area networks and wide area networks such as the Internet. The system 300 may send and receive data and/or requests for files via one or more message packets 326 over the network 327.

The apparatus 300 may further comprise a graphics subsystem 330, which may include a graphics processing unit (GPU) 335 and graphics memory 337. The graphics memory 337 may include a display memory (e.g., a frame buffer) used for storing pixel data for each pixel of an output image. The graphics memory 337 may be integrated in the same device as the GPU 335, connected as a separate device with GPU 335, and/or implemented within the memory unit 302. Pixel data may be provided to the graphics memory 337 directly from the processing unit 301. In some embodiments, the graphics unit may receive a video signal data extracted from a digital broadcast signal decoded by a decoder (not shown). Alternatively, the processing unit 301 may provide the GPU 335 with data and/or instructions defining the desired output images, from which the GPU 335 may generate the pixel data of one or more output images. The data and/or instructions defining the desired output images may be stored in memory 302 and/or graphics memory 337. In an embodiment, the GPU 335 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 335 may further include one or more programmable execution units capable of executing shader programs.

The graphics subsystem 330 may periodically output pixel data for an image from the graphics memory 337 to be displayed on a video display device 340. The video display device 350 may be any device capable of displaying visual information in response to a signal from the apparatus 300, including CRT, LCD, plasma, and OLED displays that can display text, numerals, graphical symbols or images. The digital broadcast receiving device 300 may provide the display device 340 with a display driving signal in analog or digital form, depending on the type of display device. In addition, the display 340 may be complemented by one or more audio speakers that produce audible or otherwise detectable sounds. To facilitate generation of such sounds, the apparatus 300 may further include an audio processor 350 adapted to generate analog or digital audio output from instructions and/or data provided by the processing unit 301, memory unit 302, and/or storage 316. The audio output may be converted to audible sounds, e.g., by a speaker 355.

The components of the apparatus 300, including the processing unit 301, memory 302, support functions 311, data storage 316, user input devices 320, network interface 325, graphics subsystem 330 and audio processor 350 may be operably connected to each other via one or more data buses 360. These components may be implemented in hardware, software or firmware or some combination of two or more of these.

Embodiments of the present invention are usable with applications or systems that utilize a camera, which may be a depth camera, sometimes also known as a 3D camera or zed camera. By way of example, and not by way of limitation, the apparatus 300 may optionally include a camera 324, which may be a depth camera, which, like the microphone 322, may be coupled to the data bus via the I/O functions. The main application 303 may analyze images obtained with the camera to determine information relating to the location of persons or objects within a field of view FOV of the camera 324. The location information can include a depth z of such persons or objects. The main application 304 may use the location information in conjunction with speech processing as described above to obtain inputs.

Figure 4:
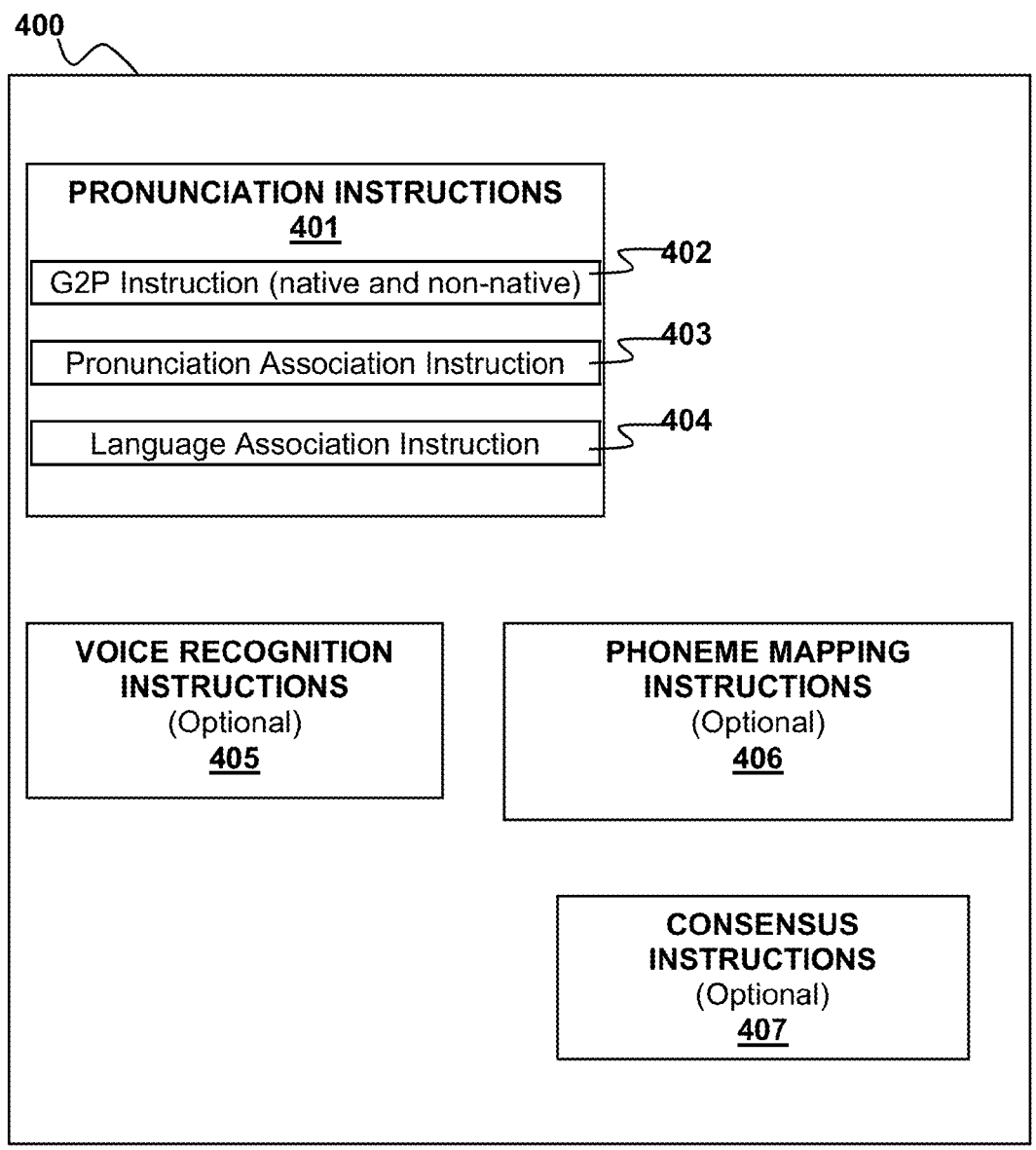
FIG. 4 is a block diagram of a computer readable medium containing computer readable instructions for implementing computer speech processing in accordance with an embodiment of the present invention.

According to another embodiment, instructions for carrying out speech processing as described above may be stored in a computer readable storage medium. By way of example, and not by way of limitation, FIG. 4 illustrates an example of a computer-readable storage medium 400. The storage medium contains computer-readable instructions stored in a format that can be retrieved interpreted by a computer processing device. By way of example, and not by way of limitation, the computer-readable storage medium 400 may be a computer-readable memory, such as random access memory (RAM) or read only memory (ROM), a computer readable storage disk for a fixed disk drive (e.g., a hard disk drive), or a removable disk drive. In addition, the computer-readable storage medium 400 may be a flash memory device, a computer-readable tape, a CD-ROM, a DVD-ROM, a Blu-ray, HD-DVD, UMD, or other optical storage medium.

The storage medium 400 contains pronunciation generation instructions 401 including one or more G2P instructions 402 for converting the input word into one or more pronunciations, wherein each pronunciation includes one or more phonemes selected from a set of phonemes associated with the second language. The G2P instructions 402 may be configured to perform G2P in two or more different languages. The pronunciation generation instructions also include one or more pronunciation association instructions 403 configured to associate each generated pronunciation with the input word in an entry in a computer database in a memory unit.

The pronunciation generation instructions 401 may also include language association instructions 404 configured to associate a phoneme language and pronunciation language with each pronunciation entry in the database.

The medium 400 may also optionally include one or more voice recognition instructions 405. The voice recognition instructions 405 may be configured for converting input speech signals to groups of input phonemes and comparing the groups of input phonemes to pronunciations in the database, e.g., as described above with respect to voice recognizer 110 of FIG. 1. The medium 400 may optionally include phoneme mapping instructions 406 that map phonemes associated with a first language to phonemes associated with a second language. The medium may also optionally include consensus instructions 407 configured to implement the consensus module 107 described above with respect to FIG. 1.

Embodiments of the present invention provide a complete system and method to automatically generate pronunciations from input words that can be of a language different from the target language. No user-intervention is needed before or after the pronunciation generation. This method generates two kinds of pronunciations: one estimated using the characteristics of the orthographic language (the language of the input word) and one estimated from the target language (the language of interest for the G2P conversion). To change the source language results in a phoneme conversion based on a cross-language intermediate phoneme mapping that is used internally. To deal with the possible excess of generated entries, a pronunciation refinement step may be applied to optimize the set of pronunciations coming from both the target and source languages. All these steps (pronunciation generation, cross-language conversion and pronunciation refinement) have been implemented on a self-contained, compact and efficient framework that allows the system to run embedded on software that implements speech recognition, such as the PlayStation Voice Response (PSVR) software.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A computer speech processing apparatus, comprising:
a memory unit;
a processing unit coupled to the memory unit;
a pronunciation generator configured for execution by the processing unit, wherein the pronunciation generator is configured to generate pronunciations that include one or more pronunciations of an input orthographic word in a first language for a non-native speaker of the first language who is a native speaker of a second language, by:
a) comparing the input word to one or more words in a partial database of words and corresponding pronunciations to determine if the input word matches any words in the partial database, wherein each word in the partial database has an associated phoneme language and pronunciation language, entering a matching word and pronunciation into a Grammar and Dictionary (GnD) for the first language when the pronunciation language and phoneme language are both the first language, entering the entering a matching word and pronunciation into a Grammar and Dictionary (GnD) for the second language when the pronunciation language is the first language and phoneme language is the second language, and b) generating a pronunciation for the input word when the input word does not match any word in the partial database and entering the input word and generated pronunciation into the GnD for the first language when the language of origin of the input word and the pronunciation language of the input word is the first language and entering the input word and generated pronunciation into the GnD for the second language when the language of origin of the input word is the first language and the pronunciation language of the input word is the second language, wherein generating the pronunciation includes converting each grapheme of the input word to a corresponding phoneme of the first language when the language of origin of the input word and the pronunciation language of the input word is the first language, and converting each grapheme of the input word to a corresponding phoneme of the first language and mapping each corresponding phoneme of the first language to one or more phonemes of the second language when the language of origin of the input word is the first language and the pronunciation language of the input word is the second language.

2. The apparatus of claim 1, further comprising:
a speech conversion unit configured to convert a sound signal produced by a speaker into a group of input phonemes, wherein the processing unit is configured to:
compare the group of input phonemes to one or more pronunciations in one or more entries in the database; and
trigger a change of state of the system corresponding to an entry that includes a pronunciation that matches the group of input phonemes.

3. The apparatus of claim 1, wherein converting each grapheme of the input word to a corresponding phoneme of the first language and mapping each corresponding phoneme of the first language to one or more phonemes of the second language includes mapping each corresponding phoneme of the first language phoneme into a corresponding intermediate phoneme and mapping each intermediate phoneme into a the one or more phonemes of the second language.

4. The apparatus of claim 1, wherein the pronunciation generator is further configured to determine a consensus from among a plurality of pronunciations for a given word in the database entry, and, based on the consensus, discard redundant, invalid or unlikely pronunciations from the entry.

5. In a computer speech processing apparatus having a processing unit and a memory unit, a computer implemented method for generating pronunciations that include one or more pronunciations of an input orthographic word in a first language for a non-native speaker of the first language who is a native speaker of a second language, the method comprising:

a) comparing the input word to one or more words in a partial database of words and corresponding pronunciations to determine if the input word matches any words in the partial database, wherein each word in the partial database has an associated phoneme language and pronunciation language, entering a matching word and pronunciation into a Grammar and Dictionary (GnD) for the first language when the pronunciation language and phoneme language are both the first language, entering the entering a matching word and pronunciation into a Grammar and Dictionary (GnD) for the second language when the pronunciation language is the first language and phoneme language is the second language, and b) generating a pronunciation for the input word when the input word does not match any word in the partial database and entering the input word and generated pronunciation into the GnD for the first language when the language of origin of the input word and the pronunciation language of the input word is the first language and entering the input word and generated pronunciation into the GnD for the second language when the language of origin of the input word is the first language and the pronunciation language of the input word is the second language, wherein generating the pronunciation includes converting each grapheme of the input word to a corresponding phoneme of the first language when the language of origin of the input word and the pronunciation language of the input word is the first language, and converting each grapheme of the input word to a corresponding phoneme of the first language and mapping each corresponding phoneme of the first language to one or more phonemes of the second language when the language of origin of the input word is the first language and the pronunciation language of the input word is the second language.

6. The method of claim 5, further comprising:
c) converting a sound signal produced by a speaker into a group of input phonemes;
d) comparing the group of phonemes to one or more entries in the database; and
e) executing a command corresponding to an entry that matches the group of input phonemes.

7. The method of claim 5, converting each grapheme of the input word to a corresponding phoneme of the first language and mapping each corresponding phoneme of the first language to one or more phonemes of the second language includes mapping each corresponding phoneme of the first language phoneme into a corresponding intermediate phoneme and mapping each intermediate phoneme into the one or more phonemes of the second language.

8. The method of claim 5, further comprising determining a consensus from a plurality of pronunciations for a given word in the database entry, and, based on the consensus, discarding redundant, invalid or unlikely pronunciations.

9. A non-transitory computer readable storage medium, having embodied therein computer readable instructions for implementing computer speech processing in a computer speech processing apparatus having a processing unit and a memory unit, the instructions comprising:

a) one or more instructions that, when executed by the processor, compare the input word to one or more words in a partial database of words and corresponding pronunciations to determine if the input word matches any words in the partial database, wherein each word in the partial database has an associated phoneme language and pronunciation language, enter a matching word and pronunciation into a Grammar and Dictionary (GnD) for the first language when the pronunciation language and phoneme language are both the first language, enter the entering a matching word and pronunciation into a Grammar and Dictionary (GnD) for the second language when the pronunciation language is the first language and phoneme language is the second language; and b) generate a pronunciation for the input word when the input word does not match any word in the partial database and entering the input word and generated pronunciation into the GnD for the first language when the language of origin of the input word and the pronunciation language of the input word is the first language and entering the input word and generated pronunciation into the GnD for the second language when the language of origin of the input word is the first language and the pronunciation language of the input word is the second language, wherein generating the pronunciation includes converting each grapheme of the input word to a corresponding phoneme of the first language when the language of origin of the input word and the pronunciation language of the input word is the first language, and convert each grapheme of the input word to a corresponding phoneme of the first language and mapping each corresponding phoneme of the first language to one or more phonemes of the second language when the language of origin of the input word is the first language and the pronunciation language of the input word is the second language.

* * * * *